E. D. TOWNSEND.
WHIFFLETREE.
APPLICATION FILED JUNE 17, 1918.

1,313,430.

Patented Aug. 19, 1919.

Inventor
ERVIN D. TOWNSEND

Witness

UNITED STATES PATENT OFFICE.

ERVIN DEWIT TOWNSEND, OF JAMESTOWN, NEW YORK.

WHIFFLETREE.

1,313,430. Specification of Letters Patent. Patented Aug. 19, 1919.

Application filed June 17, 1918. Serial No. 240,480.

*To all whom it may concern:*

Be it known that I, ERVIN DEWIT TOWNSEND, a citizen of the United States, residing at Jamestown, in the county of Chautauqua and State of New York, have invented certain new and useful Improvements in Whiffletrees, of which the following is a specification.

The object of this invention is to provide a new and improved form of whiffle-tree which is provided with means whereby any shock or strain thrown on the horse by the load it is drawing, will be cushioned so that it will not injure the shoulders of the horse.

This and other objects of the invention will be fully illustrated in the drawings, described in the specification and pointed out in the claim at the end thereof.

In the several figures of the drawing, like reference numerals indicate like parts.

Figure 1:
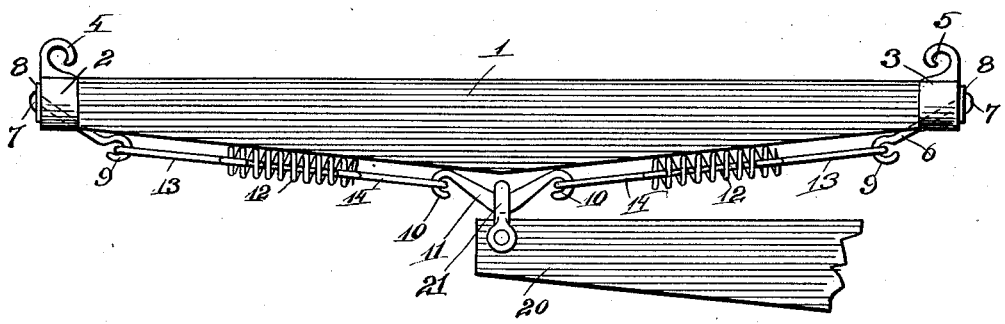
Figure 1 is a top plan view of the whiffle-tree.
Figure 2:
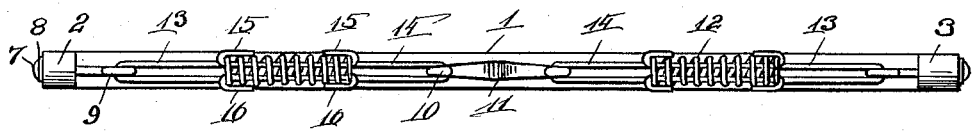
Fig. 2 is a rear elevation of the whiffle-tree.
Figure 3:
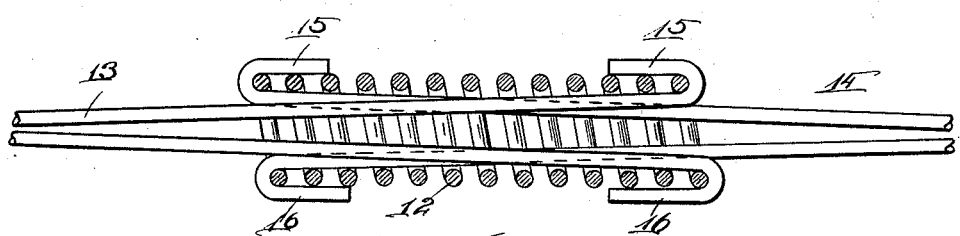
Fig. 3 is a vertical section of one of the compression springs used for cushioning the load on the whiffle-tree.

The general design of the whiffle-tree shown in the drawings may follow any one of the well-known types of whiffle-trees which comprise a bar 1 which is broad and heavy in the middle, and tapers slightly toward each end, so as to make it stiff. End irons 2 and 3 are suitably attached to each end of the bar 1 and are provided with hooks 4 and 5 to which the traces of the harness may be hitched. A bolt 6 passes angularly through each of the end irons 2 and 3, from the rear, and is fastened to the end of the tree by a head or bur 7 or other suitable means, with a washer 8 interposed between it and the end of the tree.

A hook 9 is formed on the bolt 6, which hook projects out at the rear of the tree near each end iron.

On the double-tree 20 is provided a clevis 21 to which is connected the evener or center iron 11. This evener is provided with a hook 10 on each end thereof, between which hooks and the hooks 9 provided on the bolt 6 are interposed the compression springs 12 which are helical in shape. V shaped links 13 and 14 are connected to the hooks 9 and 10 and hold the springs 12 in place between them. The links 13 and 14 are V shaped, and have hooks on the open ends thereof. The links 13 and 14 pass through the inside of the springs 12 from opposite ends to the hooks 9 with which the closed ends of the links engage. The hooks 15 and 16 formed on the open end of each of the links 13 and 14 engage the ends of the spring by hooking over one or more of the end coils thereof.

The spring 12 is held under a slight compression between the hooks 15 and 16 provided on the ends of the links 13 and 14 respectively, and the center iron 11 is thereby held close against the whiffle-tree.

From the foregoing, it will be seen that any sudden load thrown on the horse will first compress the springs 12 and cushion the shock caused thereby, and will not injure the shoulders of the horse.

I claim.

In a whiffle-tree, the combination of a rigid member tapered from the middle toward the ends, end irons attached to the end of the member having hooks on one side thereof, a bolt passing angularly through each of the end irons, each of said bolts having a hook thereon exposed near the end of the whiffle tree, a center iron, a compression spring interposed between each side of said center iron and said hooks, U-shaped links connecting said springs with said center iron and with said hooks, said links being adapted to pass through said springs and engage the opposite ends of said springs, so as to hold said springs in compression between them, said springs lying normally against the tapered sides of the rigid member.

In testimony whereof I affix my signature in the presence of two witnesses.

ERVIN DEWIT TOWNSEND.

Witnesses:
  Moss W. PHILLIPS,
  ANDRE L. LITTLE.